United States Patent [19]
Brehe

[11] 3,916,511
[45] Nov. 4, 1975

[54] METHOD OF MAKING MAGNETIC HEADS AND THE LIKE

[75] Inventor: Harold C. Brehe, Thousand Oaks, Calif.

[73] Assignee: Minnesota Mining and Manufacturing Company, St. Paul, Minn.

[22] Filed: Aug. 12, 1974

[21] Appl. No.: 496,660

Related U.S. Application Data
[62] Division of Ser. No. 364,926, May 28, 1973, abandoned.

[52] U.S. Cl. ............... 29/603; 29/423; 29/467; 29/527.1; 29/559; 249/62; 249/139
[51] Int. Cl.² ............... G11B 5/42; H01F 7/06
[58] Field of Search .......... 29/603, 423, 467, 527.1, 29/559; 264/162, 163, 272, 277, 317; 249/61, 62, 139; 269/7

[56] References Cited
UNITED STATES PATENTS

| | | | |
|---|---|---|---|
| 995,537 | 6/1911 | Hertner et al. | 269/7 |
| 2,615,111 | 10/1952 | Paquette et al. | 264/163 X |
| 2,988,804 | 6/1961 | Tibbetts | 264/317 X |
| 3,120,696 | 2/1964 | Lubkin | 29/603 |
| 3,384,954 | 5/1968 | Bradford et al. | 29/603 |
| 3,389,461 | 6/1968 | Hardardt | 29/527.1 X |
| 3,534,470 | 10/1970 | Faure et al. | 29/603 |

*Primary Examiner*—Carl E. Hall
*Attorney, Agent, or Firm*—Ellsworth R. Rosten

[57] ABSTRACT

A method of making a device from a plurality of components comprising providing a fixture, positioning the components in the fixture with the fixture locating at least some of the components, joining the components together to form the device, reducing a portion of the fixture to a nonsolid state thereby removing a portion of the fixture from the device and exposing a portion of the device, mounting the fixture utilizing reference surfaces on the fixture, performing a work operation on such portion of the device with the fixture so mounted, and reducing the remainder of the fixture to a nonsolid state thereby removing the fixture from the device.

5 Claims, 20 Drawing Figures

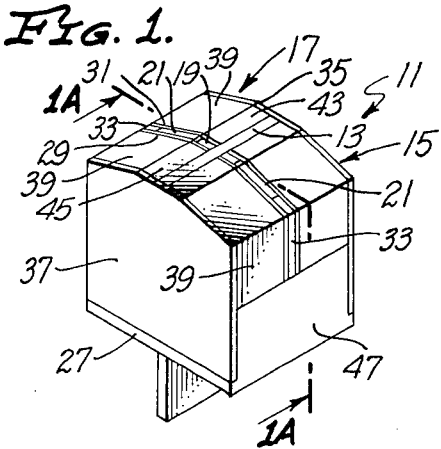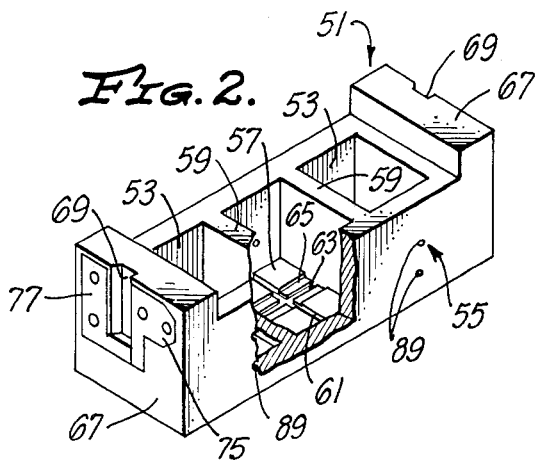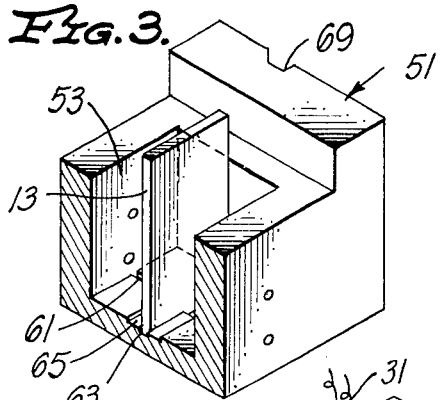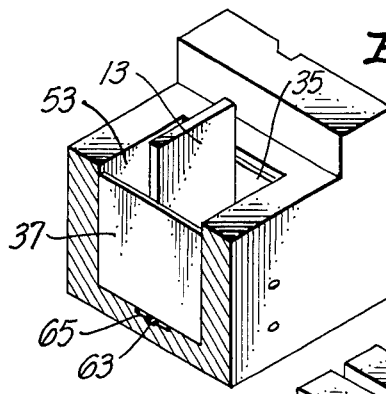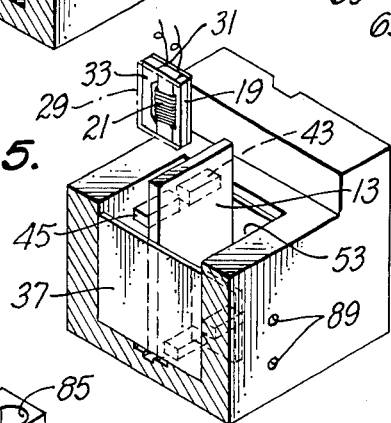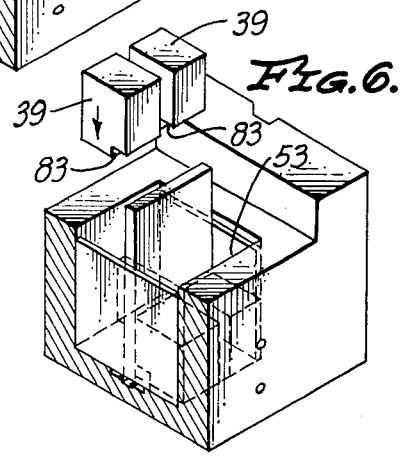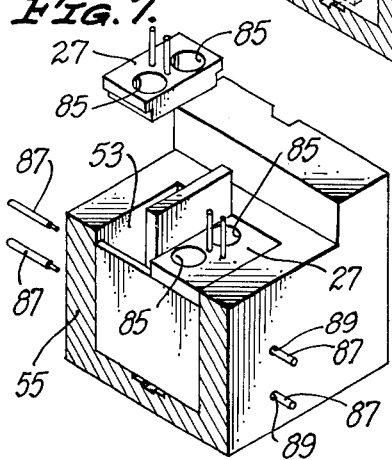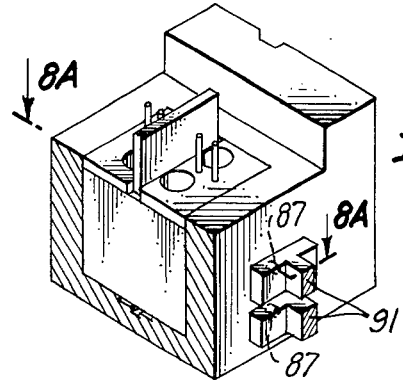

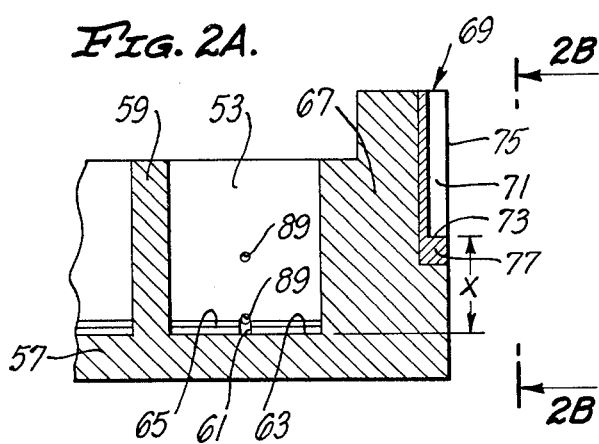
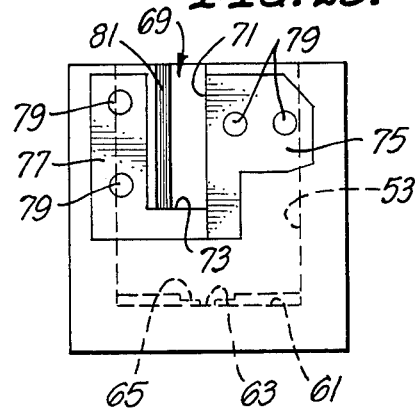
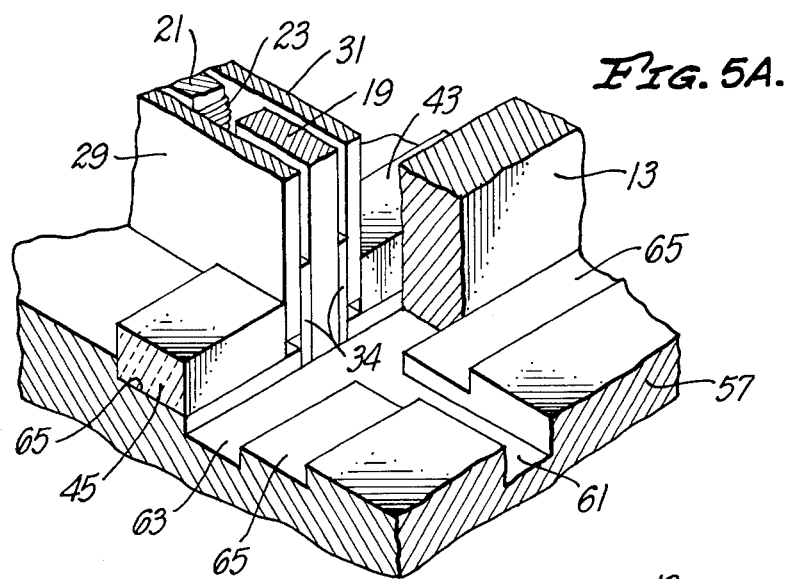
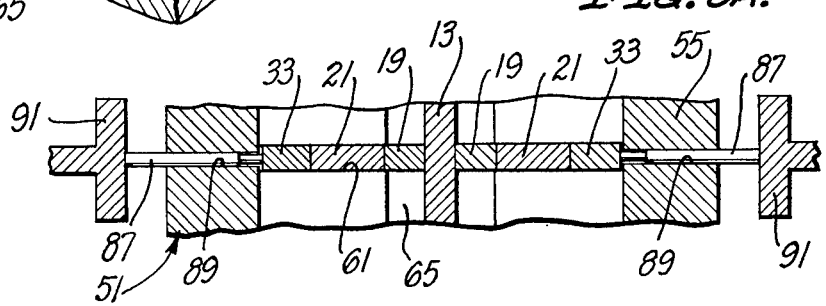
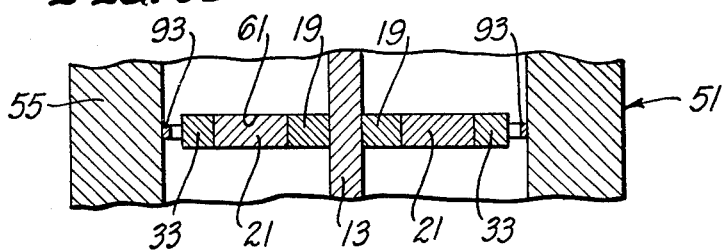

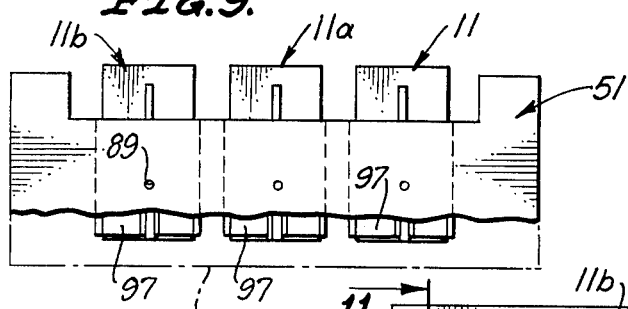
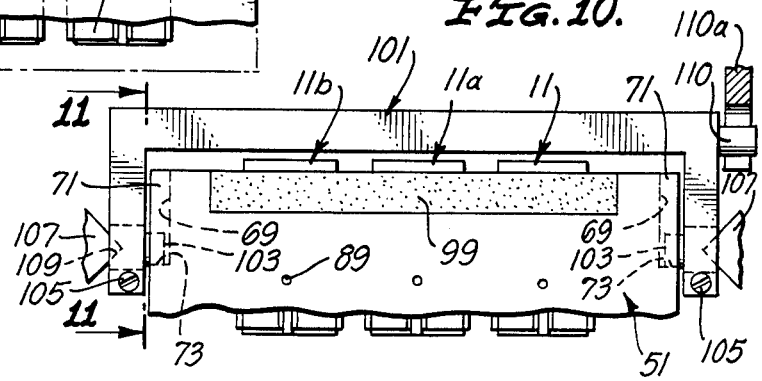
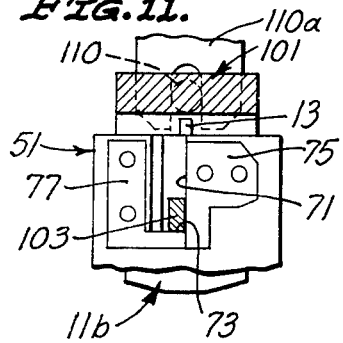
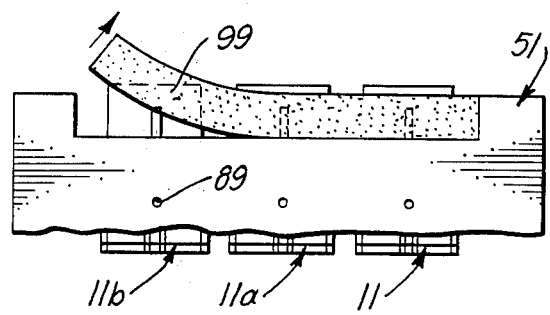
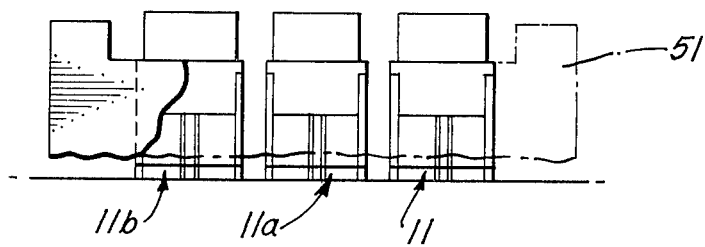

METHOD OF MAKING MAGNETIC HEADS AND THE LIKE

CROSS-REFERENCES TO RELATED APPLICATIONS

This is a divisional application of application Ser. No. 364,926, filed on May 29, 1973, for METHOD OF MAKING MAGNETIC HEADS AND THE LIKE AND FIXTURE THEREOF.

BACKGROUND OF THE INVENTION

Under certain circumstances, the assembly of a device is one of the most difficult portions of a manufacturing process. For example, assembly can be extremely difficult if the parts to be assembled are small or if the parts must be assembled to close tolerances.

One example of a very difficult assembly task is the assembly of the parts or components of a magnetic head. Some of the parts of a typical magnetic head are very small, and in order for the head to perform satisfactorily, the parts must be meticulously assembled to close tolerances. The magnetic head must be machined or otherwise worked upon subsequent to assembly. During this work operation, the position of a concealed portion of the magnetic head assembly known as the gap throat must be known in relation to the other parts of the device. In short, tiny parts, close tolerances, and the need to accurately machine the magnetic head subsequent to assembly cooperate to make manufacture of magnetic heads most difficult.

SUMMARY OF THE INVENTION

The present invention materially facilitates the assembly of a device and the subsequent work operations performed on the assembled device. Although this invention is particularly adapted for precision manufacturing operations, it may also be applied to manufacturing operations where close tolerances are not required.

One of the first steps in the method of this invention is the accurate positioning of the components of the device to be assembled. This is accomplished by providing a fixture having locator means for relatively positioning some of the components. The locator means can advantageously include locator grooves into which at least some of the components are placed to locate the components relative to each other. The locator grooves are constructed and arranged in accordance with the desired orientation of the components.

In the case of magnetic head assemblies, first and second intersecting grooves are provided for the center shield and cores, respectively. The cores must be held in engagement with the center shield. To accomplish this the cores are urged along the second groove and against the center shield by a rigid member extending through an aperture in a peripheral wall of the fixture. Alternatively, this may be accomplished by a spring acting between the peripheral wall of the fixture and the core.

After the components are accurately positioned, they are appropriately joined together as by an encapsulating material to form the device. With some devices, such as magnetic head assemblies, it is then necessary to perform a work operation such as machining on the assembled device.

With the present invention, such subsequent work operation can be performed with the assembled device on the fixture thereby eliminating the need to remove the fixture at this time. Furthermore, by simply mounting the fixture on a fixture mounting device, the location of the device with respect to the fixture mounting device is accurately and automatically established. This materially facilitates set up for the work operation.

To accomplish this, the fixture is provided with one or more reference surfaces which are used in mounting the fixture on the fixture mounting device. The reference surfaces locate the fixture relative to the fixture mounting device. The location of the reference surfaces relative to the locator grooves is also known. Accordingly, the location of the locator grooves and the parts located thereby relative to the fixture mounting device is established. The fixture mounting device is in turn located relative to the cutting or grinding tool so that the work operation can be accurately carried out with set-up time being held to a minimum.

The locator grooves are defined by a wall of the fixture. For at least some applications, the surfaces which are placed into the locator grooves and against the wall of the fixture are the surfaces to be machined or otherwise worked upon subsequent to assembly. The present invention makes this possible by the removal of this wall to expose the surfaces to be worked upon.

Although the wall removal process could be carried out in different ways, it is preferred to remove the wall by reducing it to a nonsolid state. This may be accomplished, for example, by melting or dissolving the wall. To facilitate melting the wall without damaging the assembled device, the fixture can advantageously be constructed of a material having a low melting point such as a low melting point alloy. If the wall is to be dissolved, a solvent which will not damage the assembled device must be selected. Upon completion of the work operation, the remainder of the fixture can be removed by reducing it to a nonsolid state. This fixture can advantageously be removed from the assembled device by reducing it to a nonsolid state even if the fixture is not used to mount the assembled device for a work operation.

More specifically, the fixture can advantageously include a peripheral wall and an end wall joined to the peripheral wall to close one end of the fixture. The peripheral wall and end wall define an open cavity and one or more partitions may be employed to divide the cavity into a plurality of open ended assembly compartments. The locator grooves can be provided in any desired wall of the fixture and may be provided in the end wall. Reference surfaces on opposite sides of the peripheral wall define mounting grooves for accurate mounting of the fixture.

In order to assure that the fixture and the device therein can be accurately retained, it is important that the material of the reference surfaces not deform or colf flow in use. Unfortunately, low melting point alloys tend to cold flow under relatively low stress. To obviate this provlem, the present invention provides relatively hard inserts in the fixture which define one or more of the reference surfaces.

The invention can best be understood by reference to the following description taken in connection with the accompanying illustrative drawing.

BRIEF DESCRIPTION OF THE DRAWINGS

FIG. 1 is a perspective view of a magnetic head which is adapted for assembly in accordance with the present invention.

FIG. 2 is a perspective view with parts broken away of a fixture constructed in accordance with the teachings of this invention.

FIG. 2A is a fragmentary longitudinal sectional view of one end portion of the fixture.

FIG. 2B is an end elevational view of the fixture taken generally along line 2B—2B of FIG. 1A.

FIGS. 3–8 are perspective views with portions of the fixture broken away illustrating certain of the steps which may be employed with the method of this invention.

FIG. 8A is an enlarged fragmentary sectional view taken generally along line 8A—8A of FIG. 8 and illustrates the function and operation of the pins which urge the I cores against the center shield. In FIG. 8A, some parts of the magnetic assembly have been omitted for clarity.

FIG. 8B is a sectional view similar to FIG. 8A illustrating an alternate method of urging the I cores against the center shield.

FIG. 9 is an elevational view of the fixture with three head assemblies therein. The broken line portions of FIG. 9 illustrate the portion of the fixture which is reduced to a nonsolid state.

FIGS. 10–12 are elevational views of the fixture with three magnetic head assemblies therein illustrating the next three steps in the method of this invention.

FIG. 13 is an elevational view illustrating the removal of the remainder of the fixture from the magnetic head assemblies.

DESCRIPTION OF THE PREFERRED EMBODIMENTS

Figure 1A:
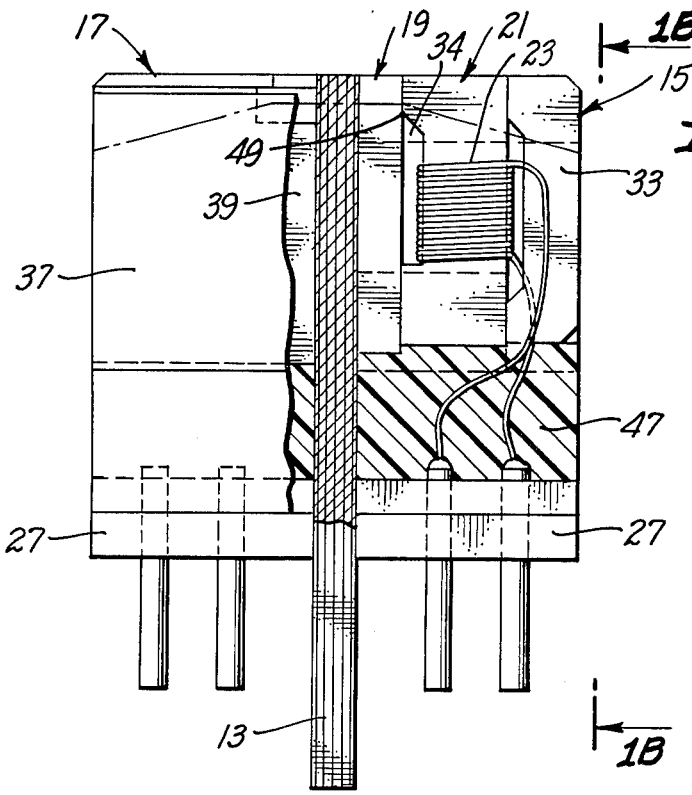
FIG. 1A is a sectional view taken generally along line 1A—1A of FIG. 1.
Figure 1B:
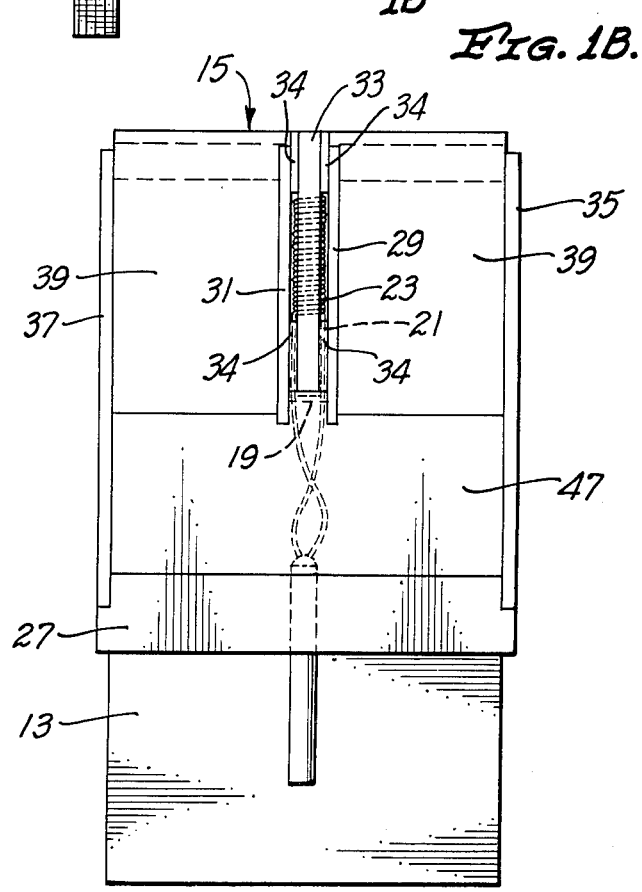
FIG. 1B is a side elevational view taken generally along line 1B—1B of FIG. 1A with some of the encapsulating material removed to expose portions of the magnetic head assembly.

FIGS. 1–1B illustrate a magnetic head assembly 11 which is adapted to be assembled utilizing the fixture and method of this invention. It should be understood, however, that the present invention is not limited to assembly of the magnetic head assembly 11 or magnetic heads, but is applicable to the manufacture of other devices. Thus, the magnetic head assembly 11 is merely illustrative of devices which can be made in accordance with the present invention.

The magnetic head assembly 11 includes a center shield 13 which extends completely through the magnetic head assembly and divides it into a write head 15 and a read head 17. The center shield 13 forms an electromagnetic shield between the heads 15 and 17. The center shield may be constructed of a high permeability magnetic material such as the material commercially available under the trademark Mu Metal laminated to highly conductive metal sheets such as copper sheets.

The heads 15 and 17 are substantially identical except for the electrical properties thereof which allow one to read and one to write. Accordingly only the head 17 is described in detail. Portions of the head 15 corresponding to portions of the head 17 are designated by corresponding reference numerals.

The head 17 includes an "I" core 19 and a "C" core 21 each of which is constructed of a suitable magnetic material such as ferrite. The C core 21 has a winding 23 (FIG. 1A) which is coupled to a terminal board 27 which provides for connecting the head 17 to an external apparatus (not shown).

The cores 19 and 21 are sandwiched between intertrack shields 29 and 31, each of which may be laminated and constructed of a high permeability magnetic material and copper. Also sandwiched between the intertrack shields 29 and 31 is a force spreader 33 which may be constructed of a nonmagnetic material having little tendency to cold flow, such as aluminum. Spacers 34 (FIG. 1B) are constructed of a nonmagnetic material such as copper are carried on the inner faces of the shields 29 and 31 to space these shields from the cores 19 and 21 sufficiently to provide space for the winding 23.

The magnetic head assembly 11 includes end shields 35 and 37 which form the opposite end walls of the head assembly 11. The end shields 35 and 37 may be constructed of a magnetic material such as Mu Metal. Filler blocks 39 are held between the end shields and the intertrack shields as shown. Inserts 43 and 45 which may be constructed of a ceramic material extend along a surface of the blocks 39, respectively, intermediate the associated end shields 35, 37 and intertrack shields 31, 29. The filler blocks 39 and 41 are constructed of nonmagnetic material such as aluminum or brass.

The various components of the magnetic head assembly 11 are held together by a matrix 47 formed of an appropriate encapsulating compound. The encapsulating compound could be, for example, a low viscosity bisphenol epoxide resin and primary aliphatic amine curing agent. Specifically, a typical suitable encapsulating compound consists of 100 parts by weight of Epon 825 (a trademark of Shell Chemical and 8–10 parts by weight of diethylenetriamine.

With reference to FIGS. 1A and 1B, the broken lines near the top of these two figures indicate the finished contour of the magnetic head assembly 11. The solid lines at the top of these two figures show the contour of the magnetic head assembly prior to the work operation illustrated in FIG. 11 hereof and described hereinbelow.

The magnetic head assembly 11 is small and the various parts or components which comprise the assembly 11 are very small. The parts of the magnetic head assembly 11 must be assembled to very close tolerances. For example, it is very important that the I core 19 be urged into tight contact with the center shield 13. It is also important that a corner of the C core 21 known as a gap throat 49 (FIG. 1A) be a predetermined distance from the finished surface of the magnetic head assembly 11. This is made particularly difficult by the fact that the gap throat 49 is in the form of a line extending along an edge of the C core 21 which is concealed, i.e., it is within the interior of the magnetic head assembly 11.

The magnetic head assembly 11 can be assembled and worked upon by employing a fixture 51 (FIGS. 2–2B). The fixture 51 is in the form of a container having three upwardly opening identical assembly compartments 53. The fixture 51 may have one or more of the compartments 53 arranged in any desired pattern. However, to facilitate the work operation described hereinbelow with reference to FIG. 11, it is preferred to provide only a single row of the assembly compartments 53. Although the fixture 51 could be constructed in different ways, it can advantageously be integrally cast.

The fixture 51 is constructed of a material which can be reduced to a nonsolid, i.e., plurality or gas, state. For example, the fixture 51 may be constructed of a low melting point alloy which is available from Cerro Corporation under end wall trademark Cerrolow 117. This low melting point alloy is soft, heavy, and has a melting point of about 117°F. Fusible alloys, such as Woods Metal, may also be used if the fixture is to be melted. If the fixture is to be dissolved it may be constructed, for example, of polystyrene and dissolved with methyl ethyl ketone.

The fixture 51 includes a peripheral wall 55, an end or bottom wall 57, and a plurality of partitions 59 for dividing the fixture into the assembly compartments 53. In the embodiment illustrated, the fixture 51 is rectangular in plan. The end wall 57 has one upwardly opening transversely extending locator groove 61 extending across a central region of each of the assembly compartments 53.

The end wall 57 also has longitudinally extending locator grooves 63 and 65 in each of the assembly compartments 53. The grooves 63 and 65 are perpendicular to the grooves 61, and the groove 65 is wider and shallower than the groove 63 as best shown in FIG. 2B. The shape, depth, orientation and length of the grooves 61, 63, and 65 can be varied depending upon the requirements of the particular device which is to be assembled in the fixture 51. In the embodiment illustrated the side walls of the grooves 61, 63 and 65 are planar and vertical so that the grooves can better hold a component placed therein vertical. The bottom walls of the grooves 61, 63 and 65 are planar and perpendicular to the side walls of the associated groove. The grooves 61, 63 and 65 are very accurately formed in the end wall 57. The grooves 61 and 63 may be of the order of .025 inch deep.

The peripheral wall 55 has identical end sections 67 at opposite ends of the fixture 51. Each of the end sections 67 projects above the adjacent regions of the peripheral wall 55 and has a mounting groove 69 extending downwardly from the upper edge of the end section. Each of the mounting grooves 69 is defined in part by intersecting perpendicular reference surfaces 71 and 73 (FIGS. 2A and 2B) defined respectively by inserts 75 and 77. Each of the inserts is constructed of relatively hard material such as steel and is in the form of a small flat bar having the configuration shown in FIG. 2B. The inserts 75 and 77 may be integral, if desired. The inserts 75 and 77 are mounted on the main body portion or matrix of the fixture 51 by a plurality of tapered pins 79 which are formed integrally with the main body portion of the fixture and project through the insert.

The inserts 75 and 77 may be of any desired shape provided that the resultant placement results in providing the desired number of reference surfaces. In the embodiment illustrated, the insert 77 completely defines the reference surface 73 and a back wall 80 of the groove 69. The vertical portion of the insert 77 supports but does not define a surface 81 of the groove 69 in that it lies immediately behind this surface. The surface 81 is not defined by a hard insert because in use very little force is applied thereto. The insert 75 completely defines the reference surface 71. Both of the mounting grooves 69 are identical and defined in the same manner as shown in FIG. 2B.

The reference surface 71 is planar and is positioned so that the longitudinal center lines of the grooves 63 and 65 are contained in the plane of the reference surface 71. The reference surface 73 also defines a plane which is spaced a predetermined distance X (FIG. 2A) from the bottom of the groove 63. In the embodiment illustrated, the reference surface 73 is perpendicular to the reference surface 71 and parallel to the longitudinal center lines of the grooves 63 and 65.

Although the inserts 75 and 77 may be attached to the remainder of the fixture 51 in different ways, it is preferred that the inserts be positioned in the mold (not shown) in which the fixture 51 is to be cast. Casting of the fixture 51 then results in the automatic embedding of the inserts 75 and 77 into the cast portion of the fixture 51. This can be accomplished in accordance with known casting techniques.

The fixture 51 can be used in the assembly and manufacture of many different devices. FIGS. 3–13 show, merely by way of illustration, how the magnetic head assembly 11 can be assembled and worked upon subsequent to assembly by employing the method steps of this invention and the fixture 51.

FIG. 3 shows the fixture 51 cut away to expose one of the assembly compartments 53. Assembly of the magnetic head assembly 11 is initiated by positioning of the center shield 13 into the locator groove 63. The width, i.e., the horizontal dimension, of the locator groove 63 is accurately controlled so that it forms a close tolerance fit with the center shield 13. For example, the clearance between the sides of the groove 61 and the center shield 13 may be about 0.001 inch. This enables the locator groove 63 to support the center shield 13 in a substantially upright position.

Secondly, the end shields 35 and 37 are inserted into the compartment 53 as shown in FIG. 4. No locator grooves are provided for receiving the end shields 35 and 37; however, grooves could be provided in the end wall 57 and/or the side walls of the compartment 53, if desired. The end shields 35 and 37 and the center shield 13 form a close tolerance fit in the compartment 53 in the direction longitudinally of the fixture 51.

Next, the cores 19 and 21, the force spreader 33, the intertrack shields 29 and 31 and the inserts 43 and 45 for the heads 17 and 15 are inserted, in that order, into the compartment 53 as shown in FIG. 5. FIG. 5 shows these components for the head 17 already positioned in the compartment 53, and these components for the head 15 about to be inserted into the component.

FIG. 5A shows how the grooves 61, 63, and 65 orient the various components of the magnetic head assembly 11. In FIG. 5A the components of one of the heads are removed for clarity. Specifically, the cores 19 and 21 are received by the locator groove 61 with the sides of the groove 61 being sized to form a close tolerance fit with the sides of the cores. The ceramic inserts 43 and 45 are positioned in, and located by, the locator grooves 65, and the intertrack shields 29 and 31 are supported by the upper surface of the end wall 57 and are not positioned in the locator grooves. The locator groove 61 is sufficiently deep and forms a sufficiently close fit with the cores 19 and 21 so as to support them in a substantially perpendicular relationship to the end wall 57. The inserts 43 and 45 engage the intertrack shields 31 and 29, respectively, and the intertrack shields, the inserts 43 and 45 and the I core 19 engage the center shield 13.

The blocks 39 are then inserted into the compartment 53 as shown in FIG. 6. Each of the blocks 39 has an undercut 83 (FIG. 6) which is adapted to receive one of the inserts 43 and 45 therein. Next, the procedure as described hereinabove with reference to FIGS. 5 and 6 is repeated for the head 17.

As described hereinabove with reference to FIGS. 5 and 6, the heads 15 and 17 are assembled at the same time. Of course with respect to the steps described in connection with FIGS. 5 and 6, each of the heads 15 and 17 may be assembled sequentially, if desired.

Next, the terminal boards 27 are inserted into the compartment 53 as shown in FIG. 7, and they are appropriately wired to the windings 23 and 25 of the C cores 21 in a conventional manner. Each of the terminal boards 27 has openings 85 therein providing communication to the interior of the compartment 53.

Next, two rigid pins 87 are inserted into apertures 89 in the peripheral wall 55. Identical pins are inserted into identical apertures on the opposite side of the peripheral wall. A sealant such as vacuum grease or uncured silicone rubber is applied to the pins 87 at the aperture 89 to seal the pin-aperture interfaces.

The pins 87 are then simultaneously advanced inwardly of the fixture 51 with the apertures 89 guiding movement of the pins. The pins 87 are retained in this inward position by appropriate external fixtures 91 with one of such fixtures being provided for each of the pins 87. FIG. 8A illustrates the function performed by the pins 87. As shown in FIG. 8A, the apertures 89 and hence the pins 87 are aligned with the corresponding aperture and pin on the opposite side of the peripheral wall 55. The pins 87 and the apertures 89 are also aligned with the longitudinal axis of the groove 61. By forcing the pins 87 inwardly, the pins 87 urge the force spreaders 33, the C cores 21, and the I cores 19 inwardly in the locator groove 61. This urges the cores 19 and 21 of each head 15 and 17 into tight engagement and urges the cores 19 into tight engagement with the center shield 13. This tight engagement is maintained by the fixtures 91 which retain the pins 87 in the inner position shown in FIGS. 8 and 8A.

FIG. 8B illustrates an alternate method which is identical to the method described hereinabove except that leaf springs 93 are employed in lieu of the pins 87. In addition, because the pins 87 are not employed, the fixture 51 in FIG. 8B need not have the apertures 89.

Each of ths springs 93 acts between an adjacent portion of the peripheral wall 55 and the associated force spreader 33. Thus, the springs 93 resiliently urge the I cores 19 inwardly in the groove 61 and into tight engagement with the opposite faces of the center shield 13. The springs 93 may be inserted into the compartment 53 immediately following the insertion of the components illustrated in FIG. 5.

With the I cores 19 urged against the center shields 13, an encapsulating material or compound is introduced into the compartment 53 through the openings 85. A vacuum may be used to assist flow of the encapsulating compound into all portions of the assembly compartment 53 not occupied by a part of the magnetic head assembly 11. The encapsulating compound is then allowed to cure in accordance with the curing requirements for the particular encapsulating compound utilized. After curing of the encapsulating compound, the pins 87 are withdrawn from the fixture 51.

The encapsulating compound forms the matrix 47. Its purposes are to bond together the parts of the magnetic head assembly 11 and to bond the assembly 11 to the fixture 51.

FIG. 9 shows the fixture 51 after three identical magnetic head assemblies 11, 11a, and 11b have been assembled therein. Next, a lower region of the fixture 51 including the bottom or end wall 57 is melted away to expose the lower portions 97 of each of the magnetic head assemblies 11, 11a, and 11b. Generally, the lower portion 97 includes the portions of the magnetic head assembly 11 which engage the end wall 57 during assembly.

The melting of the lower portion of the fixture 51 can be carried out in various ways so long as this portion of the fixture is heated at least to its melting point and so long as the temperatures involved do not damage the magnetic head assemblies in the fixture. For example, if the fixture 51 is constructed of Cerrolow which melts at about 117°F., the end wall 57 can be melted away by hot tap water or by placing it in a pan on a heat source with the end wall 57 facing down.

With the lower portions 97 exposed, a work operation can be performed thereon. To protect the upper ends of the magnetic head assemblies during this work operation, a layer 99 of protective material is applied to the upper ends of the magnetic head assemblies as shown in FIG. 10. The layer 99 which may be, for example, of silicon rubber extends, in the embodiment illustrated, to a level flush with the upper surface of the fixture 51.

The fixture 51 is then mounted in a fixture mounting device or yoke 101 as shown in FIGS. 10 and 11. Because the magnetic head assemblies 11, 11a and 11b are mounted on the fixture 51, the yoke 101 mounts the magnetic head assemblies for a work operation.

Although the fixture 51 could be mounted in different ways, in the embodiment illustrated, the yoke 101 is in the form of a U-shaped bracket having mounting lugs 103 which are received within the mounting grooves 69 and which engage the reference surfaces 73 and 71. The reference surfaces 71 and 73 position the fixture 51 relative to the yoke 101. The lugs 103 can be integral with the remainder of the yoke or inserts which are affixed to the remainder of the yoke. In the embodiment illustrated, the lugs 103 are in the form of inserts retained on the main portion of the yoke by screws 105. The yoke 101 is in turn mounted by pointed shafts 107 which are received within recesses 109 in the yoke 101. The yoke 101 is held in position by a lug 110 the yoke and a suitable fixed positioning element 110a.

With the fixture 51 mounted in this fashion, the location of all of the components of the magnetic head assembly 11 relative to the yoke 101, the shafts 107, and the machine (not shown) which is to perform a work operation on the lower portion 97 of the magnetic head assemblies is known. This is because the reference surfaces 71 and 73 are accurately located with respect to the grooves 61, 63 and 65. Furthermore, the dimensions of the parts of the magnetic head assembly 11 are known. Accordingly, by merely using the reference surfaces 71 and 73, as illustrated by way of example in FIGS. 10 and 11, the location of the magnetic head assembly 11 and of the internal structure of the head assembly relative to all members employed to mount the head assembly is known. This enables the work operations performed subsequent to assembly to be initiated very rapidly.

The work operation performed with the fixtures 51 mounted as shown in FIGS. 10 and 11 may be, for example, machining or contour grinding. After this work operation has been performed, each of the magnetic head assemblies 11b has a contour as shown by way of example in FIG. 11 and by the broken line in FIG. 1A. It is apparent that this work operation can be performed simultaneously on a row of the magnetic head assemblies.

Upon completion of this work operation, the layer 99 is mechanically removed from the fixture 51 shown in FIG. 12. The remainder of the fixture 51 is then removed by reducing it to a nonsolid state. This may be implemented, for example, by melting of the remainder of the fixture 51 as discussed hereinabove with reference to FIG. 9. This leaves the three completed magnetic head assemblies 11, 11a and 11b and the inserts 75 and 77. The melted material of the fixture 51 and the inserts 75 and 77 can be reused.

Although exemplary embodiments of this invention have been shown and described, many changes, modifications and substitutions may be made by those having ordinary skill in the art without necessarily departing from the spirit and scope of this invention.

I claim:

1. A method of making a magnetic head assembly of the type which comprises a plurality of components including a center shield and first and second cores on opposite sides of the center shield, said method comprising:

providing a fixture which includes a peripheral wall and an end wall defining at least one open-ended assembly compartment with the end wall having first and second intersecting locator grooves therein, said fixture having a reference surface which is accurately located with respect to said locator grooves;

positioning the center shield in said first groove and positioning the first and second cores in the second groove on opposite sides of the center shield;

inserting additional components of the magnetic head into the cavity;

urging the first and second cores along said second groove and into contact with the second shield;

pouring a hardenable substance into the compartment and allowing said substance to harden to thereby join together at least some of the components of the magnetic head assembly;

reducing at least a portion of the end wall to a nonsolid state thereby removing said portion of the end wall to expose a portion of the magnetic head assembly including the center shield and the cores;

mounting the fixture on a fixture mounting device with the fixture mounting device contacting the reference surface to accurately position the fixture and the magnetic head assembly;

performing a work operation on the exposed portion of the magnetic head assembly; and reducing a sufficient portion of the remainder of said fixture to a nonsolid state to allow removal of the fixture from the magnetic head assembly.

2. A method as defined in claim 1 wherein at least one of said steps of removing includes melting a section of the fixture.

3. A method as defined in claim 1 wherein reducing includes dissolving said portion of said fixture.

4. A method of assembling a plurality of components comprising:

providing a fixture having means for locating the components;

positioning the components on the fixture with said means locating at least some of said components;

joining said components together to form a device while the components are on the fixture; and reducing at least a portion of said fixture to a nonsolid state thereby removing said portion of said fixture from the device, said fixture including a first wall, said step of reducing including first reducing at least a substantial portion of said first wall to a nonsolid state to expose a portion of the device and thereafter reducing the remainder of the fixture to a nonsolid state sufficiently to allow removal of the remainder of the fixture from the device, said method also including mounting the fixture and performing a work operation on at least said portion of the device with the fixture so mounted subsequent to the removal of said portion of said first wall and prior to the complete removal of the fixture from the device.

5. A method as defined in claim 4 wherein said locating means includes at least one groove in said first wall and said step of positioning includes placing at least one of the components in said groove to thereby position said component.

* * * * *